UNITED STATES PATENT OFFICE.

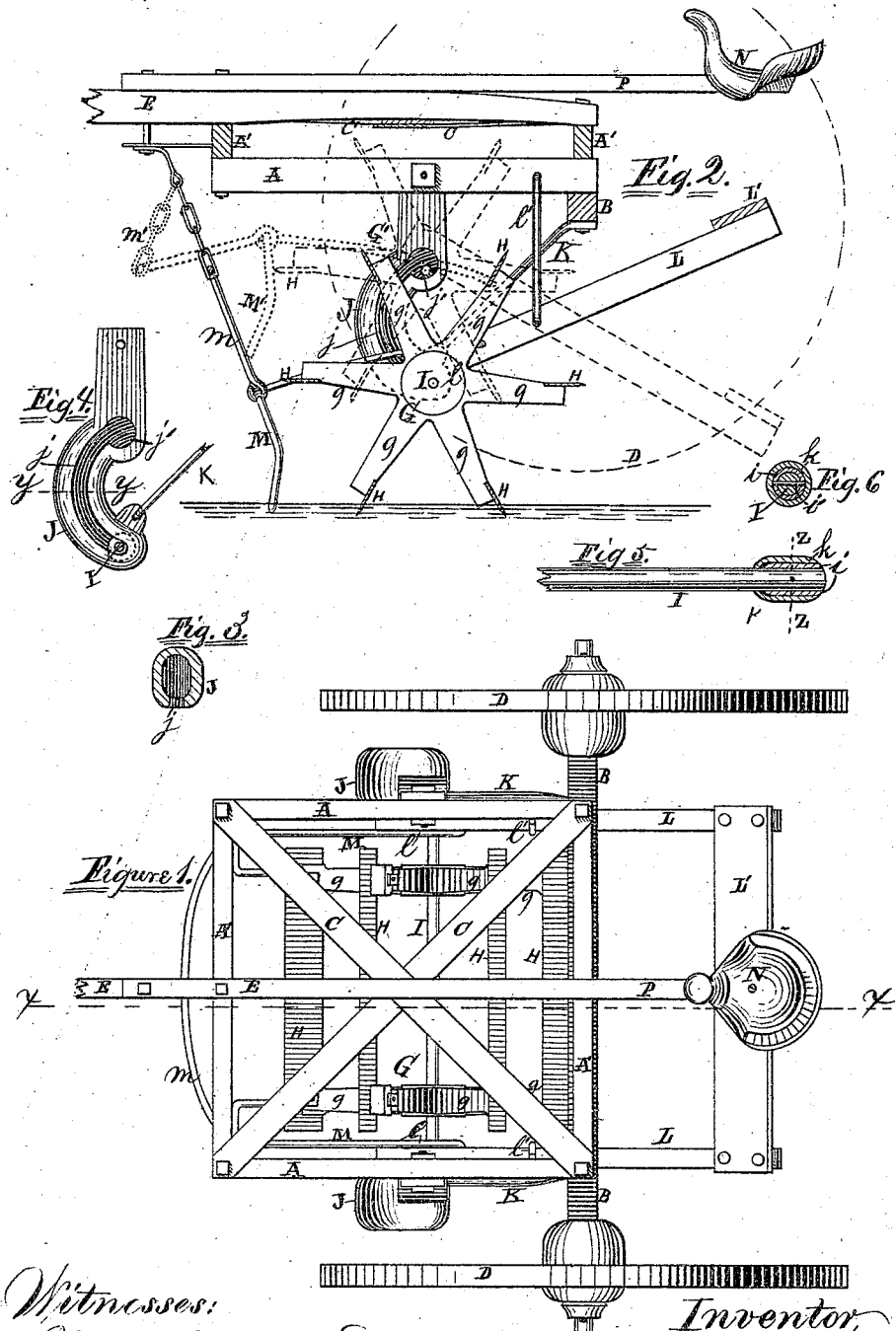

JAMES C. LEIDY, OF GALESBURG, ILLINOIS.

IMPROVEMENT IN STALK-CUTTERS.

Specification forming part of Letters Patent No. 130,584, dated August 20, 1872.

Specification describing certain Improvements in Stalk-Cutters, invented by JAMES C. LEIDY, of Galesburg, county of Knox and State of Illinois.

The nature of my invention relates to improvements in machines for cutting corn-stalks in the field into short and suitable lengths for turning under with an ordinary plow, and to prevent their interference with the cultivation of the soil for the succeeding crop. The invention consists, first, in the construction and arrangement of the devices for attaching the cylinder of cutters to the main frame, in such manner that the said cylinder may be dropped into and retained in a working position, at the same time elevating and receiving the weight of the main frame, wheels, and driver; or the said cylinder of cutters may be elevated and sustained free from the surface of the ground, and all without hooks, catches, or other devices than the form of the attaching device, and the use of the ordinary foot-levers, all as hereinafter fully described; second, it consists in attaching the drag-hooks to the other devices in such manner that they will be elevated or dropped, respectively, with the elevation and dropping of the cylinder of cutters.

Figure 1 is a top view of a machine embodying my invention. Fig. 2 is a vertical sectional view of Fig. 1 on the line $x\ x$. Fig. 3 is a sectional view of that part of Fig. 4 crossed by the line $y\ y$. Fig. 4 is a detail view. Fig. 5 is a longitudinal sectional view of one of the journals on the end of the cylinder of cutter's shaft, and Fig. 6 is a cross-sectional view of the same journal on the line $z\ z$ of Fig. 5.

The longitudinal bars A A, connected by transverse bars A' A', constitute the main frame, supported on an axle, B, and braced by diagonal bars or rods C C, the whole supported on wheels D D, and carrying a draft-pole, E. G is the cylinder of cutters, constructed in the usual way, with radial arms $g$ $g\ g\ g\ g$ at each end, carrying the cutters H H H H H and a central shaft, I. J J are hangers attached at their upper ends to the side-frame pieces A A, and their lower portions constructed so as to form bearings for the journals on the cylinder of cutter's shaft, as hereinafter described. The lower portion of the hangers J J are tubular, and curved in the arc of a circle, as shown at Figs. 2 and 4, and have each a slot, $j$, down its side toward its fellow. The slots $j$ are enlarged at their upper ends and turned backward, as shown at $j'$, Figs. 2 and 4, and the inner surface of the tubes J J are made to conform to the same turn. K K are braces extending one from the lower end of each hanger J to the under side of the axle B. The shaft I is a cylindrical bar with a ring, $i\ i$, on each end secured by a pin, $i'$, as shown at Figs. 5 and 6. $k\ k$ are sleeves fitting loosely over the rings $i\ i$, and formed small at their adjacent ends, so that they will be retained on the shaft I by the rings $i\ i$, as shown at Fig. 5. The sleeves K constitute anti-friction journals in the tubular bearings J J, both in the rotation of the shaft I and in its sliding movement up and down in the slots $j\ j$. L L are the foot-levers, their rear ends connected by a transverse bar, L', and their forward ends provided with loops $l$ encircling the shaft I, and suspended near their centers by rods $l'\ l'$ from the frame pieces A A, so that their rear ends may be depressed and made to raise their forward ends, and with them the cylinder of cutters. M M are the drag-hooks, pivoted to the bars L L at their rear ends, extending forward and curved downward at their forward ends to form the hooks, and held in working position by a bale, $m$, when the cutters are lowered for operation in the field. The bale $m$, being suspended by a chain, $m'$, from the under side of the draft-pole, it will be seen that when the cylinder of cutters G is raised by the levers L, that the hooks M will be raised also, as the shaft I will strike the hooks M forward of where they are pivoted to the levers L L. The hooks M are so pivoted to the levers L as to allow them to rise in passing over ordinary obstructions. N is the driver's seat, supported on the rear end of a spring-bar, P, the spring-bar P being secured at its forward end to the draft-pole E.

The operation of my invention is as follows: The rearward draft on the cylinder of cutters will draw the journals on the ends of the shaft I back, and thereby force them into the lower and rearward end of the tubular bearings J J when the machine is drawn forward in operation, thus elevating the main frame A A' and wheels D D, as shown at Fig. 2 by full lines, and thereby throwing the weight of the frame, wheels, and driver onto the cylinder of cutters.

The same operation, it will be seen by full lines at Fig. 2, also, will lower the drag-hooks into working position. The spring-bar P will relieve the driver from the jolting common to this class of cutter-cylinders. By pressing with his feet on the bar L' the driver may raise the forward ends of the levers L L, and cause the journals on the shaft I to traverse the tubular bearings J J until they reach their upper ends, where, settling into the turns $j'$, they will hold the cylinder of cutters and the hooks M in the position shown by dotted lines at Fig. 2, letters G' and M', in convenient elevation for transportation of the machine from place to place. By a slight pressure forward on the bar L' or levers L L the cutters will be again dropped into working position.

Having thus described my invention, what I desire to claim as new, is—

1. The tubular bearings J J, when constructed as described, in a curved form, and arranged to operate with the cylinder of cutters G and shaft I, substantially as described, and for the purpose specified.

2. The drag-hooks M M, when connected with and operated by the levers L, so as to be raised and lowered in connection with the cylinder of cutters G, substantially as and for the purpose set forth.

3. The anti-friction journals K $i$, when arranged to operate with the shaft I and tubular bearings J J, substantially as described, and for the purpose set forth.

JAMES C. LEIDY.

Witnesses:
 M. H. BARRINGER,
 A. W. BERGGREN.